United States Patent
Glose

(10) Patent No.: US 11,271,511 B2
(45) Date of Patent: Mar. 8, 2022

(54) METHOD FOR OPERATING A ROTATING FIELD MACHINE OF A MOTOR VEHICLE, TRANSMISSION DEVICE, DRIVE UNIT AND MOTOR VEHICLE

(71) Applicant: Bayerische Motoren Werke Aktiengesellschaft, Munich (DE)

(72) Inventor: Daniel Glose, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/965,705

(22) PCT Filed: Jan. 11, 2019

(86) PCT No.: PCT/EP2019/050602
§ 371 (c)(1),
(2) Date: Jul. 29, 2020

(87) PCT Pub. No.: WO2019/149502
PCT Pub. Date: Aug. 8, 2019

(65) Prior Publication Data
US 2021/0044240 A1  Feb. 11, 2021

(30) Foreign Application Priority Data
Jan. 30, 2018  (DE) .................... 10 2018 201 340.3

(51) Int. Cl.
*H02P 1/32* (2006.01)
*H02P 3/20* (2006.01)
(Continued)

(52) U.S. Cl.
CPC ............... *H02P 25/22* (2013.01); *B60K 1/00* (2013.01); *B60L 53/20* (2019.02); *H02P 27/06* (2013.01)

(58) Field of Classification Search
CPC .......... H02P 25/22; H02P 27/06; B60L 53/20; B60K 1/00
(Continued)

(56) References Cited

U.S. PATENT DOCUMENTS 8,373,372 B2 * 2/2013 Su ........................... H02P 25/22
                                                       318/400.27
2012/0230070 A1   9/2012 Chen et al.
(Continued)

FOREIGN PATENT DOCUMENTS

| DE | 10 2011 078 155 A1 | 1/2013 |
| EP | 2 727 235 B1 | 3/2015 |
| WO | WO 2005/034333 A1 | 4/2005 |

OTHER PUBLICATIONS

International Search Report (PCT/ISA/210) issued in PCT Application No. PCT/EP2019/050602 dated Apr. 5, 2019 with English translation (five (5) pages).
(Continued)

*Primary Examiner* — Erick D Glass
(74) *Attorney, Agent, or Firm* — Crowell & Moring LLP

(57) ABSTRACT

A method is provided for operating a rotating field machine of a motor vehicle, wherein at least two winding systems of the rotating field machine are supplied with current from an intermediate circuit via a transmission device having at least two switching units and wherein respective switching sequences for the switching units for supplying the winding system in question are defined. For the switching sequences, first switching states in which current is drawn from the intermediate circuit and second switching states in which no current is drawn are defined. The first switching states of the respective switching sequences are defined so as to be free of overlap. For at least one of the switching sequences, third switching states are defined, in which current is fed into the
(Continued)

intermediate circuit. The third switching states are defined so as to overlap with the first switching states of the other switching sequence.

10 Claims, 4 Drawing Sheets

(51) Int. Cl.
　　　*H02P 7/06*　　　(2006.01)
　　　*H02P 25/22*　　(2006.01)
　　　*B60L 53/20*　　(2019.01)
　　　*B60K 1/00*　　　(2006.01)
　　　*H02P 27/06*　　(2006.01)
(58) Field of Classification Search
　　　USPC ........................................................ 318/496
　　　See application file for complete search history.

(56) References Cited

U.S. PATENT DOCUMENTS

2017/0264229 A1\* 9/2017 Murata .................... B60L 7/003
2019/0089171 A1\* 3/2019 Fischer .................... H02J 7/025

OTHER PUBLICATIONS

German-language Written Opinion (PCT/ISA/237) issued in PCT Application No. PCT/EP2019/050602 dated Apr. 5, 2019 (seven (7) pages).
German-language Search Report issued in German Application No. 10 2018 201 340.3 dated Mar. 21, 2018 with partial English translation (13 pages).
German-language Office Action issued in German Application No. 10 2018 201 340.3 dated Nov. 14, 2018 (four (4) pages).

\* cited by examiner

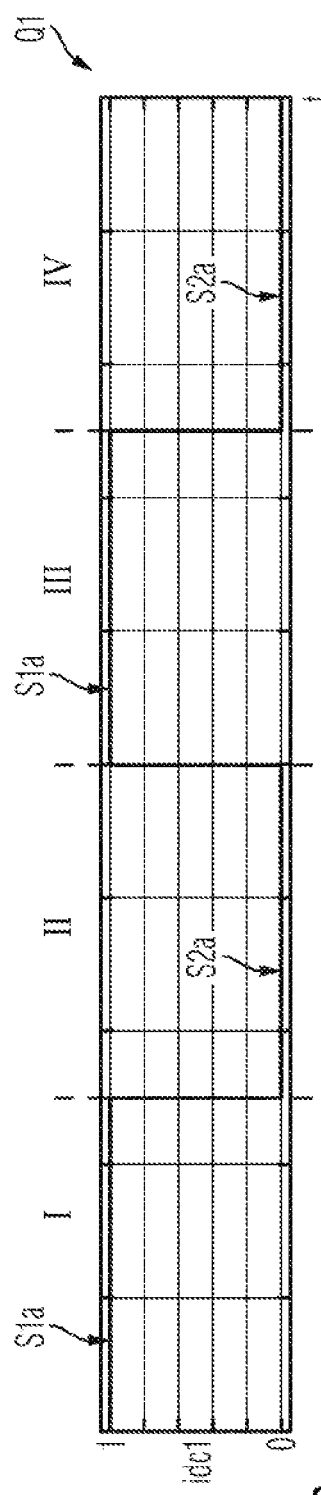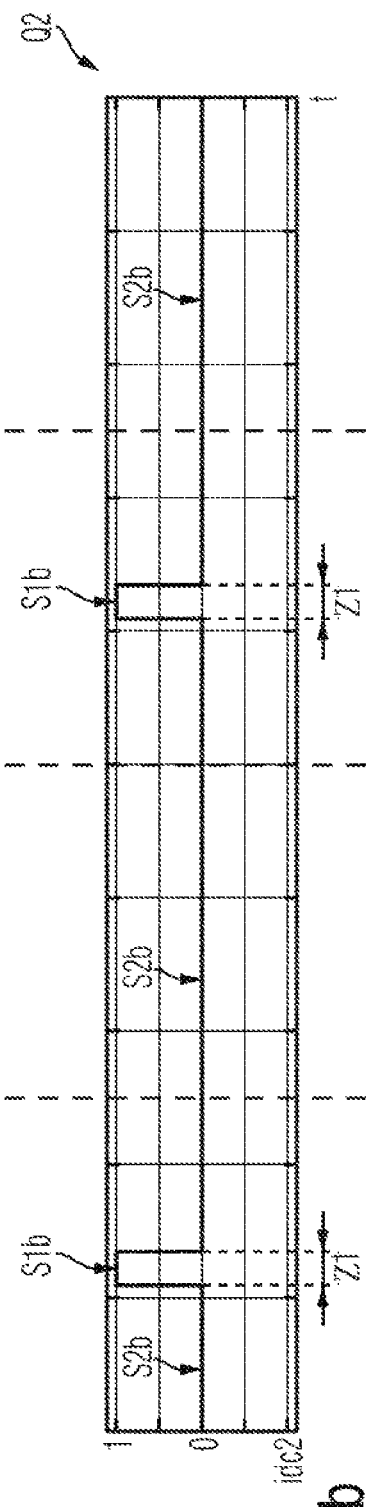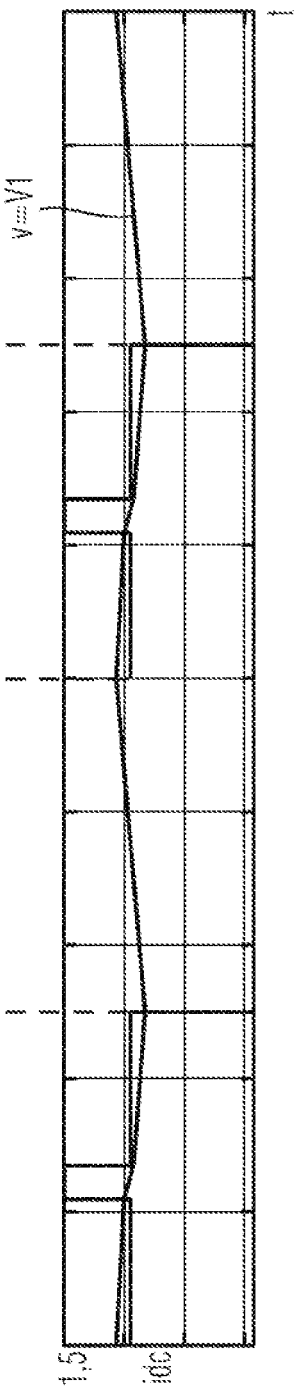

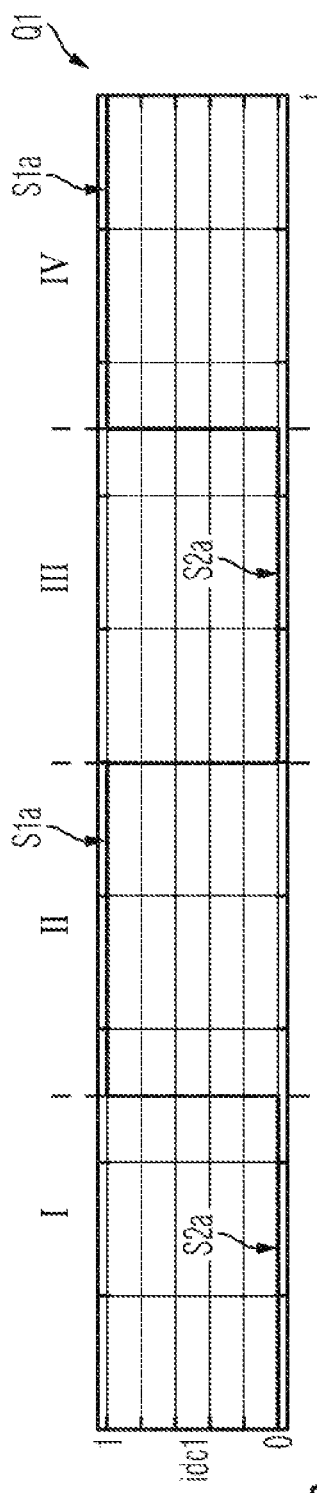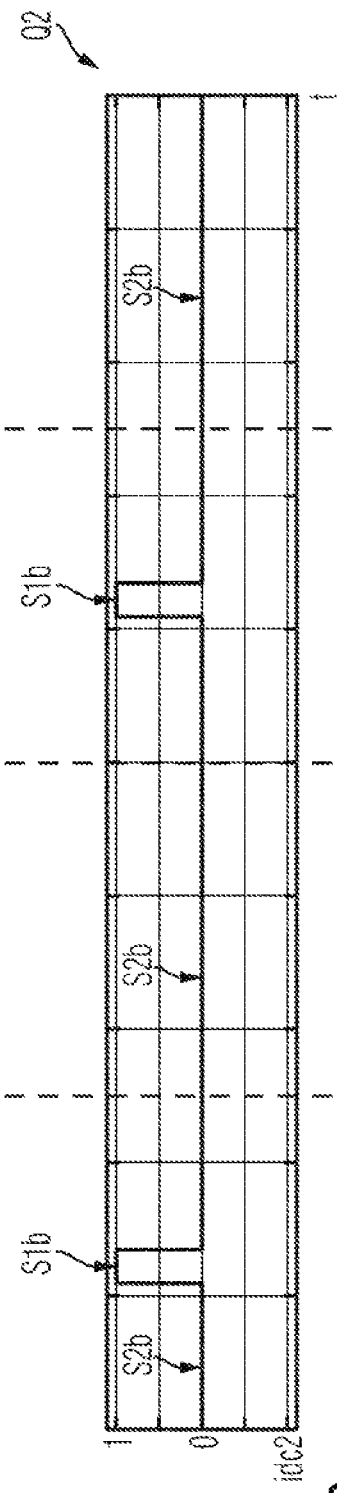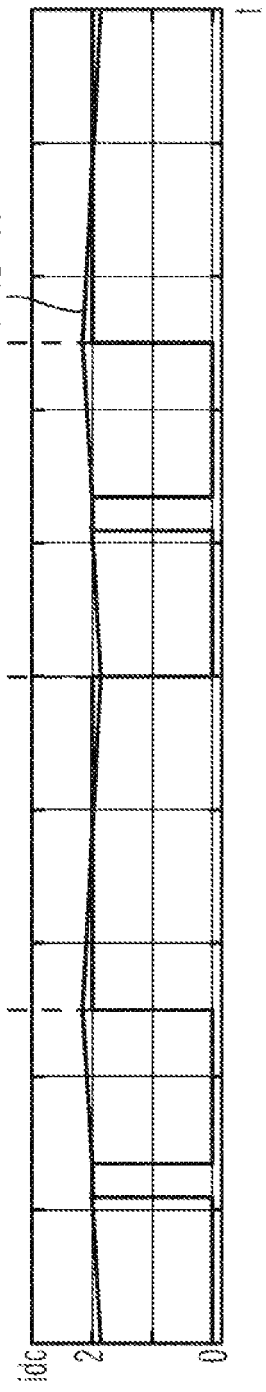

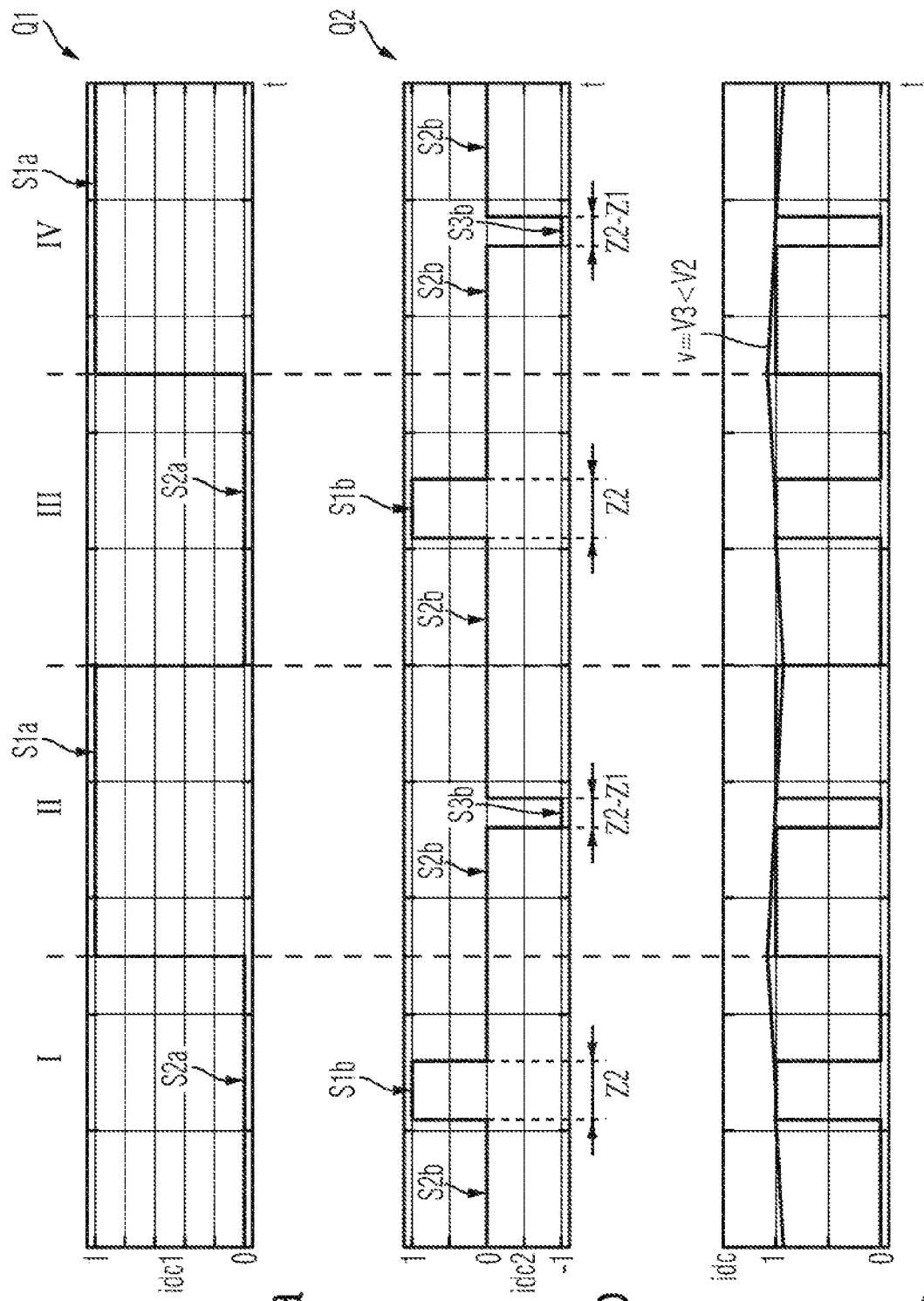

METHOD FOR OPERATING A ROTATING FIELD MACHINE OF A MOTOR VEHICLE, TRANSMISSION DEVICE, DRIVE UNIT AND MOTOR VEHICLE

BACKGROUND AND SUMMARY OF THE INVENTION

The invention relates to a method for operating a rotating field machine of a motor vehicle, in which at least two winding systems of the rotating field machine are supplied with current from an intermediate circuit by means of a transmission device having at least two switching units, and in which a first switching sequence for a first switching unit for supplying a first winding system and at least one second switching sequence for at least one second switching unit for supplying a second winding system are determined for each operating cycle, wherein first switching states, in which the respective switching units draw current from the intermediate circuit, and second switching states, in which the switching units do not draw current from the intermediate circuit, are determined for the at least two switching sequences, and wherein the first switching states in the first switching sequence are determined so as to not overlap the first switching states in the second switching sequence. The invention also relates to a transmission device, to a drive unit and to a motor vehicle.

In the present case, the focus of interest is on rotating field machines or three-phase machines which can be used, for example, as drive machines for electrically drivable motor vehicles and which have at least two winding systems. Such rotating field machines can be separately excited or permanently excited, for example. In this case, the at least two winding systems are supplied with current from a common intermediate circuit via a transmission device. In the case of an n-phase rotating field machine, the transmission device may be, for example, an n-phase inverter having a number of strands with controllable switches which corresponds to the number of phases. In this case, in order to energize the phases according to predetermined switching sequences, the switches are controlled in such a manner that a rotating magnetic field is generated in the rotating field machine and drives a rotor of the rotating field machine. In this case, first switching states, in which current flows from the intermediate circuit through the transmission device to the rotating field machine, on the one hand, and second switching states, in which no current flows from the intermediate circuit through the transmission device to the rotating field machine, on the other hand, exist during the switching sequences. The resulting current fluctuations or distortions cause fluctuations in the intermediate circuit voltage which are usually attenuated by means of a smoothing capacitor or intermediate circuit capacitor. The smoothing capacitors required usually have a large capacitance and a high dielectric strength and are therefore accordingly dimensioned and very cost-intensive.

In order to reduce such intermediate circuit fluctuations and to therefore make it possible to use smaller and cheaper intermediate circuit capacitors, WO 2005/034333 A1 discloses a method for operating a permanently excited n-phase rotating field machine with the aid of an inverter. The inverter comprises n strands which are fed from a DC intermediate circuit and are each intended to supply one phase of the n-phase rotating field machine. In this case, a space vector to be generated in the n-phase rotating field machine is determined in successive operating cycles. In addition, a first switching sequence is determined for the switches in a first group of i strands which each supply phases of the n-phase rotating field machine supplementing a first, i-phase rotating field machine in such a manner that these i phases make a first contribution to the space vector. Furthermore, a second switching sequence is determined for the switches in a second group of j strands which each supply phases of the n-phase rotating field machine supplementing a second, j-phase rotating field machine in such a manner that these j phases provide the remaining contribution to the space vector. In this case, the switching sequences are determined in such a manner that the times in which the strands in the second group draw a current from the intermediate circuit do not correspond or only incompletely correspond to the times in which the strands in the first group draw a current from the intermediate circuit. The groups of strands are then controlled on the basis of the determined switching sequences.

The object of the present invention is to extend the method according to the prior art to the effect that fluctuations or distortions of the intermediate circuit current can be reduced further.

This object is achieved, according to the invention, by means of a method, a transmission device, a drive unit and a motor vehicle having the features according to the respective independent patent claims. The dependent patent claims, the description and the figures relate to advantageous embodiments of the invention.

A method according to the invention is used to operate a rotating field machine of a motor vehicle, in which at least two winding systems of the rotating field machine are supplied with current from an intermediate circuit by means of a transmission device having at least two switching units. In this case, a first switching sequence for a first switching unit for supplying a first winding system and at least one second switching sequence for at least one second switching unit for supplying a second winding system are determined for each operating cycle. First switching states, in which the respective switching units draw current from the intermediate circuit, and second switching states, in which the switching units do not draw current from the intermediate circuit, are determined for the at least two switching sequences, wherein the first switching states in the first switching sequence are determined so as to not overlap the first switching states in the second switching sequence. In addition, third switching states, in which the assigned switching unit feeds a current provided by the assigned winding system into the intermediate circuit, are determined for at least one of the switching sequences, wherein the third switching states are determined so as to overlap the first switching states in the respective other switching sequence.

According to one embodiment of the invention, an n-phase rotating field machine having the first winding system in the form of a first phase system with i phases and the at least one second winding system in the form of a second phase system with j phases, where $i+j<=n$, is operated as the rotating field machine by means of the transmission device having an n-phase inverter, wherein the switching sequences are determined in such a manner that the first phase system supplied via the first switching unit of the n-phase inverter and the second phase system supplied via the second switching unit of the n-phase inverter generate a predetermined space vector.

According to a further embodiment of the invention, a separately excited rotating field machine having the first winding system in the form of a phase system of a stator of the separately excited rotating field machine and the at least one second winding system in the form of an excitation winding system of a rotor of the separately excited rotating field machine is operated as the rotating field machine by the transmission device having the first switching unit in the form of an inverter and the second switching unit in the form of an excitation device, wherein the phase system of the stator is supplied with current from the intermediate circuit via the inverter and the excitation winding system is supplied with current from the intermediate circuit via the excitation device.

The rotating field machine may be a separately excited rotating field machine or a permanently excited rotating field machine. At least in the case of the permanently excited rotating field machine, the latter has the first phase system and the second phase system as the at least two winding systems. The first phase system can be understood as meaning an i-phase rotating field machine and the second phase system can be understood as meaning a j-phase rotating field machine, which act on a common shaft and supplement the n-phase rotating field machine. The n-phase rotating field machine may be, for example, a six-phase rotating field machine (n=6) which is formed from two three-phase rotating field machines (i=3, j=3). A rotor of the n-phase rotating field machine has a permanent magnet here. In the case of the separately excited rotating field machine, the latter has the phase system of the stator as the first winding system and the excitation winding system of the rotor as the second winding system. The separately excited rotating field machine may also have a third winding system in the form of a further phase system, with the result that the two phase systems in turn supplement an n-phase rotating field machine. The separately excited rotating field machine may in turn be in the form of, for example, a six-phase rotating field machine (n=6), which is formed from two three-phase rotating field machines, or in the form of a single three-phase rotating field machine (n=3).

In this case, the at least two winding systems are supplied with energy from a common intermediate circuit, which energy is provided, for example, by an electrical energy store of the motor vehicle. In this case, the transmission device has an intermediate circuit capacitor or smoothing capacitor for attenuating any distortions, wherein the intermediate circuit capacitor is connected in parallel with the switching units of the transmission device, in particular. In the case of the n-phase rotating field machine formed from an i-phase rotating field machine and a j-phase rotating field machine, the transmission device is an n-phase inverter having a first group of i strands, which are connected in parallel and have switches for supplying the i phases of the i-phase rotating field machine, and a second group of j strands, which are connected in parallel and have switches for supplying the j phases of the j-phase rotating field machine. The switches in the first group of i strands form the first switching unit and the switches in the second group of j strands form the second switching unit. In the case of the separately excited rotating field machine, the transmission device has an inverter having a number of strands, which are connected in parallel and have switches for supplying phases of the rotating field machine, which number corresponds to the number of phases of the rotating field machine, and an excitation device for supplying the excitation winding system of the rotor of the rotating field machine. In this case, the switches of the inverter form the first switching unit. The excitation device for the rotor has at least one switch which forms the second switching unit and via which the excitation current supplied to the rotor from the intermediate circuit can be influenced. A reactive power behavior of the rotating field machine can be controlled, in particular, via the excitation current.

In this case, a switching sequence is predefined for each of the at least two switching units. In the case of the n-phase rotating field machine formed from a plurality of rotating field machines, a predetermined space vector can be generated by the switching sequences for each operating cycle, which space vector indicates the direction and the strength of the magnetic field at a time corresponding to the operating cycle. The space vectors generated in a plurality of successive operating cycles describe a rotating magnetic field which is generated in the n-phase rotating field machine and drives the rotor and therefore the shaft. For this purpose, the switches of the inverter are closed and opened according to a predetermined pattern for each operating cycle. In the case of the separately excited rotating field machine, the space vector can be generated for each operating cycle by determining the first switching sequence and the reactive power behavior of the rotating field machine can be influenced by determining the second switching sequence.

In this case, the first switching states, in which current is supplied to the corresponding phases, and the second switching states, in which no current is supplied to the corresponding phases, exist in the switching sequence for the inverter or the first group of strands of the inverter. In other words, the first switching states correspond to times in which current is drawn from the intermediate circuit, and the second switching states correspond to times in which no current is drawn from the intermediate circuit. If, as a result of the second switching sequence, that is to say the switching sequence for the second group of strands of the inverter and/or for the excitation device of the rotor, the times in which the second switching unit draws current from the intermediate circuit were now to overlap the times in which the first switching unit draws current from the intermediate circuit, the fluctuations or distortions of the intermediate circuit current would be intensified. In order to prevent this, the switching sequences are determined in such a manner that these times do not overlap and the switching units draw current from the intermediate circuit with a time delay.

Ideally, the switching sequences are determined in this case in such a manner that the switching units alternately draw current from the intermediate circuit and a constant intermediate circuit current is therefore drawn from the intermediate circuit during the operating cycles. In particular, if it is not possible to alternately predefine the first switching states, for example because the switching cycles cannot be selected as desired, at times at which one of the switching units supplies the associated winding system with current and in the process draws current from the intermediate circuit, the respective other switching unit will be controlled in such a manner that current flows or is fed from the winding system corresponding to the other switching unit into the intermediate circuit. The third switching state is therefore predefined for the other switching unit which currently does not draw current from the intermediate circuit. Distortions of the intermediate circuit current can therefore be reduced further in an advantageous manner. As a result, a particularly cost-effective intermediate circuit capacitor of small dimensions can be used.

In the case of the separately excited rotating field machine, the third switching states are preferably determined for the second switching sequence of the excitation device, with the result that the excitation winding system of the rotor feeds current into the intermediate circuit via the excitation device for the first switching states in the first switching sequence in which the inverter draws current from the intermediate circuit in order to supply the phase system of the stator. At times at which the first switching unit feeds current from the intermediate circuit into the phases of the stator in order to generate a predetermined space vector, the second switching unit is therefore controlled in such a manner that current flows from the excitation winding system of the rotor into the intermediate circuit. This embodiment takes into account the fact that the excitation winding system of the rotor has a lower energy requirement than the phase system of the stator. The current fluctuations which occur as a result of this unequal energy requirement can be reduced by feeding current back through the excitation winding system.

It proves to be advantageous if a period of a first switching state of one switching unit is determined so as to be in the center of a period of a second switching state of the other switching unit. In other words, a first switching state of one switching unit is in the center between two first switching states of the other switching unit. The advantage that a maximum value of distortions of the intermediate circuit current can be reduced results from such control of the switching units.

A period of a third switching state in one switching sequence is particularly preferably determined so as to be in the center of a period of a first switching state in the other switching sequence. This means that current is drawn from the intermediate circuit in a first partial period of the period of the first switching state of one switching unit, current is simultaneously drawn from and supplied to the intermediate circuit in a second partial period, and current is only drawn from the intermediate circuit again in a third partial period. In this case, the first and third partial periods are the same. Such a predefinition of the switching sequences has a particularly positive effect on the intermediate circuit fluctuations.

In one development of the invention, a current requirement is determined for the at least temporarily feeding winding system for each operating cycle, and a period of the first switching states in the switching sequence of the assigned switching unit is determined in such a manner that a total current fed into the winding system is the sum of the current requirement and a predetermined surplus current. A period of the third switching state is determined in such a manner that the surplus current is fed back into the intermediate circuit. At times of one switching sequence in which one switching unit dose not draw current from the intermediate circuit, the other switching unit therefore draws more current from the intermediate circuit than actually required by the associated winding system during the first switching state in the other switching sequence. This excess energy is then fed back into the intermediate circuit at times in which one switching unit draws current from the intermediate circuit. In the case of the separately excited rotating field machine, the second switching unit draws more current from the intermediate circuit than actually required by the excitation winding system of the rotor during the first switching state in the second switching sequence at times in which the first switching unit does not draw current from the intermediate circuit for the phase system of the stator during the first switching sequence. This excess current is then fed into the intermediate circuit again via the second switching unit at times in which the first switching unit draws current from the intermediate circuit.

The invention also relates to a transmission device for a drive unit of a motor vehicle, having at least two switching units for supplying at least two winding systems of a rotating field machine of the drive unit with a current from an intermediate circuit, having a smoothing capacitor and having a control device for controlling the switching units, wherein the control device is designed to carry out a method according to the invention or an advantageous embodiment thereof. The transmission device may be, for example, an n-phase inverter for supplying an n-phase rotating field machine. The transmission device may additionally have an excitation device for supplying an excitation winding system. The control device can be integrated in a control unit of the motor vehicle, for example.

The invention also relates to a drive unit for a motor vehicle, having a rotating field machine and a transmission device according to the invention. The rotating field machine may be in the form of a separately excited or permanently excited rotating field machine, for example.

A motor vehicle according to the invention comprises a drive unit according to the invention. The motor vehicle is, in particular, in the form of an electric or hybrid vehicle which can be driven using the drive unit according to the invention.

The embodiments and their advantages presented with respect to the method according to the invention accordingly apply to the transmission device according to the invention, to the drive unit according to the invention and to the motor vehicle according to the invention.

Further features of the invention emerge from the claims, the figures and the description of the figures. The features and combinations of features mentioned above in the description and the features and combinations of features mentioned in the description of the figures below and/or shown solely in the figures can be used not only in the respectively stated combination, but also in other combinations or alone.

The invention is now explained in more detail on the basis of a preferred exemplary embodiment and with reference to the drawings.

BRIEF DESCRIPTION OF THE DRAWINGS

FIGS. 3a to 3c show current profiles for first embodiments of switching sequences of switching units of a drive unit;

FIGS. 4a to 4c show current profiles for second embodiments of switching sequences of switching units of a drive unit; and FIGS. 5a to 5c show current profiles for third embodiments of switching sequences of switching units of a drive unit.

In the figures, identical and functionally identical elements are provided with the same reference signs.

DETAILED DESCRIPTION OF THE DRAWINGS

Figure 1:
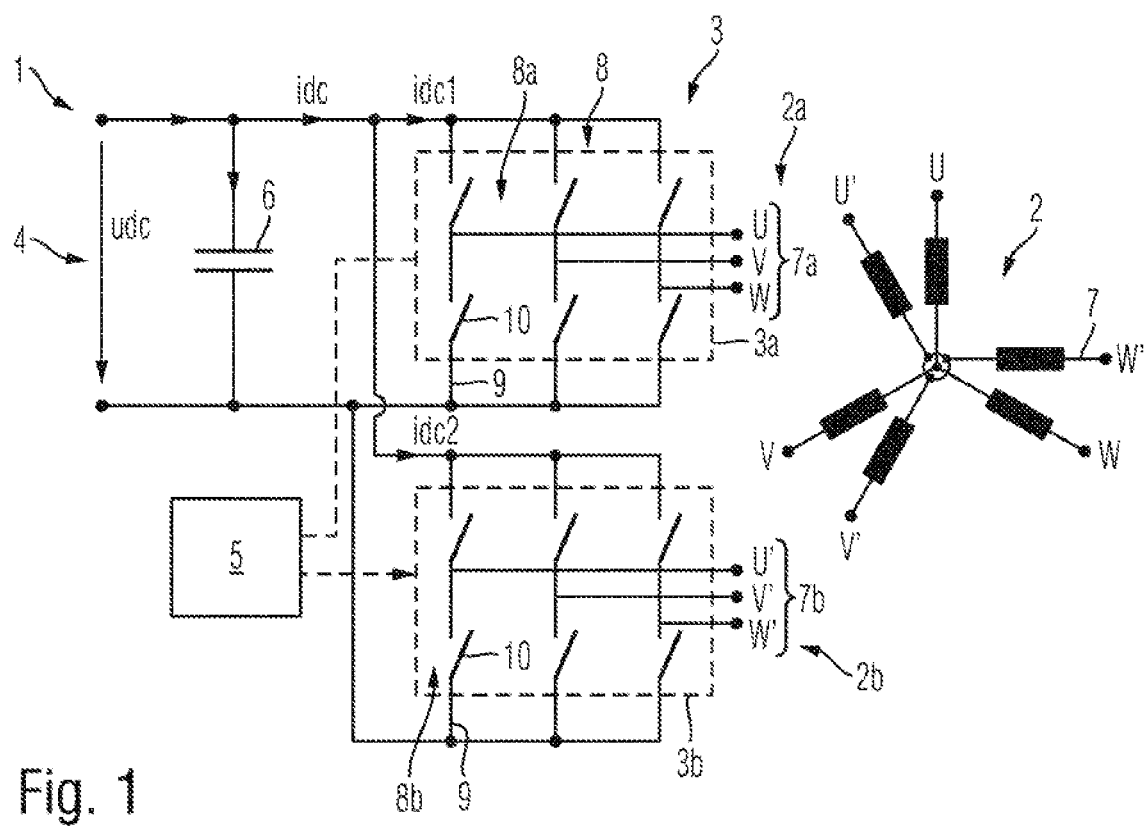
FIG. 1 shows a schematic illustration of a first embodiment of a drive unit according to the invention.
Figure 2:
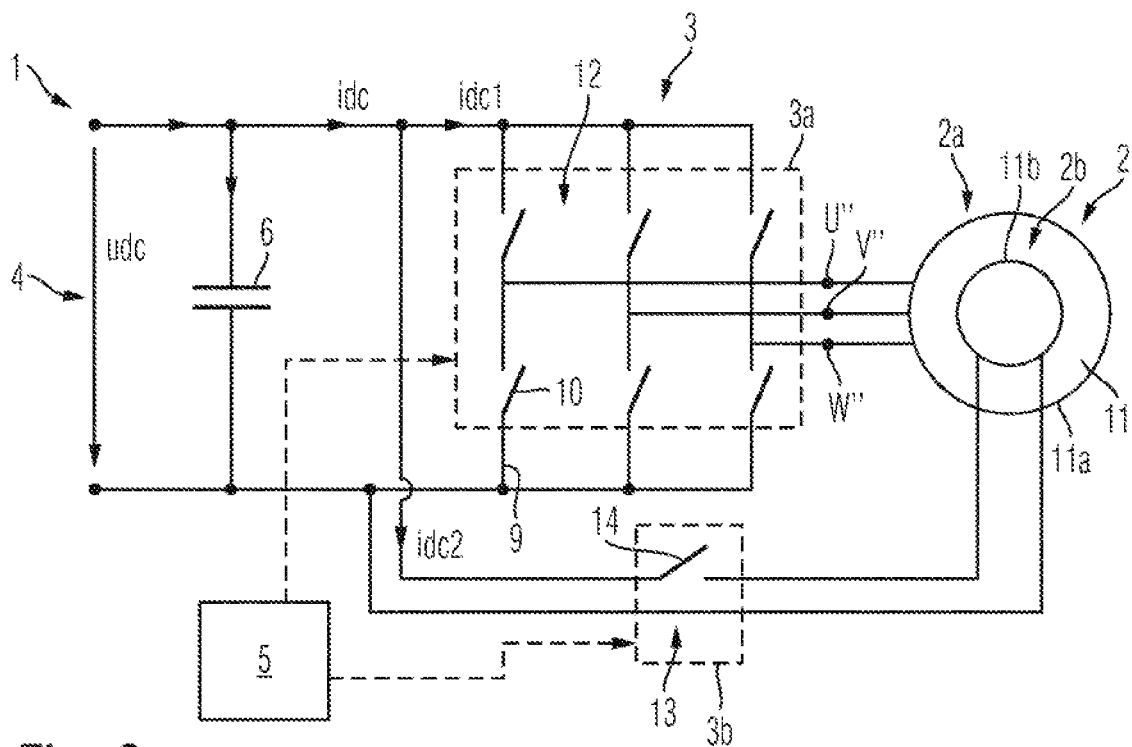
FIG. 2 shows a schematic illustration of a second embodiment of a drive unit according to the invention.

FIG. 1 and FIG. 2 show embodiments of a drive unit 1 for a motor vehicle which is not shown here. The drive unit 1 has a rotating field machine 2 having at least two winding systems 2a, 2b. The drive unit 1 also has a transmission device 3 having at least two switching units 3a, 3b which are designed to supply the at least two winding systems 2a, 2b with current idc1, idc2 from an intermediate circuit 4. For this purpose, switching sequences are predefined and provided for each switching unit 3a, 3b of the transmission device 3 by a control device 5 of the transmission device 3 for each operating cycle. The switching sequences comprise first switching states, in which current idc1, idc2 is drawn from the intermediate circuit 4, and second switching states, in which no current idc1, idc2 is drawn from the intermediate circuit 4. On account of these different switching states for each operating cycle, the total intermediate circuit current idc fluctuates, which results in fluctuations in an intermediate circuit voltage udc. In order to attenuate the fluctuations in the intermediate circuit voltage udc, the transmission device 3 has an intermediate circuit capacitor or smoothing capacitor 6. In this case, the dimensions and costs of the smoothing capacitor 6 are influenced by a severity of the fluctuations in the intermediate circuit voltage udc.

According to FIG. 1, the rotating field machine 2 is in the form of an n-phase rotating field machine 7, where n=6. The n-phase rotating field machine 7 has a first, i-phase system 7a, where i=3, as the first winding system 2a and a second, j-phase system 7b, where j=3, as the second winding system 2b. The first phase system 7a comprises the phases U, V, W which are connected at a common neutral point here, and the second phase system 7b comprises the phases U', V', W' which are likewise connected at a common neutral point here. The phase systems 7a, 7b here form two three-phase rotating field machines which drive a common shaft by means of the rotation of a common rotor, for example a permanently excited rotor, and therefore supplement the n-phase rotating field machine 7.

The transmission device 3 here has an n-phase inverter 8, where n=6. The first switching unit 3a forms a first, i-phase inverter 8a, where i=3, and is used to energize the first phase system 7a. The second switching unit 3b forms a second, j-phase inverter 8b, where j=3, and is used to energize the second phase system 7b. In order to energize the respective phase system 7a, 7b, the three-phase inverters 8a, 8b each have a number of strands 9 which are connected in parallel and have controllable switches 10, which number corresponds to the number of phases U, V, W; U', V', W'. The switches 10 may be, for example, semiconductor switches in the form of power MOSFETs and can be opened and closed by the control device 5. In this case, in order to generate a predetermined space vector in the six-phase rotating field machine 7, the control device 5 predefines a first switching sequence for the switches 10 of the first three-phase inverter 8a and a second switching sequence for the switches 10 of the second three-phase inverter 8b. The switches 10 of the three-phase inverters 8a, 8b are then controlled by the control device 5 according to the predetermined switching sequences.

According to FIG. 2, the rotating field machine 2 is in the form of a separately excited m-phase rotating field machine 11, where m=3. The separately excited three-phase rotating field machine 11 has a stator with a phase system 11a, which is used to form the first winding system 2a, and a rotor with an excitation winding system 11b, which is used to form the second winding system 2b. The phase system 11a has three phases U", V", W" which are energized by a three-phase inverter 12 of the transmission device 3 in order to generate a predetermined space vector. For this purpose, a first switching sequence is determined and predefined for the switches 10 in the strands 9 of the three-phase inverter 12 which forms the first switching unit 3a of the transmission device 3. As the second switching unit 3b, the transmission device 3 has an excitation device 13 with a controllable switch 14. An excitation current which can be used to control a reactive power behavior of the separately excited three-phase rotating field machine 11 is supplied to the excitation winding system 11b of the rotor as the current idc2 via the excitation device 13. For this purpose, a second switching sequence for opening and closing the controllable switch 14 is specified for the excitation device 13 by the control device 5 of the transmission device 3.

In order to reduce the fluctuations in the intermediate circuit voltage udc and therefore to be able to provide a cost-effective smoothing capacitor 6 with particularly small dimensions, the control device 5 determines the first and second switching sequences in such a manner that the first switching states in the first switching sequence and the first switching states in the second switching sequence do not overlap. Current idc1 is therefore only respectively drawn from the intermediate circuit 4 by the first switching unit 3a or current idc2 is drawn from the intermediate circuit 4 by the second switching unit 3b and is supplied to the respective winding system 2a, 2b. In order to further reduce the fluctuations, third switching states are determined for at least one of the switching sequences, in which third switching states the respective switching unit 3a, 3b feeds a current provided by the assigned winding system 2a, 2b into the intermediate circuit 4. In this case, the third switching states are determined so as to overlap the first switching states in the respective other switching sequence. This means that current is fed into the intermediate circuit 4 via one switching unit 3a, 3b, while the other switching unit 3a, 3b draws current idc1, idc2 from the intermediate circuit 4.

FIGS. 3a to 5c illustrate phases I, II, III, IV of current profiles of the currents idc1, idc2, idc during an operating cycle of the rotating field machine 2 for the switching sequences Q1, Q2 of the switching units 3a, 3b. FIGS. 3a, 4a and 5a each show the current profile of the current idc1 against the time t between the first switching unit 3a of the transmission device 3 and the first winding system 2a during the first switching sequence Q1. The current values idc1=1 according to FIGS. 3a, 4a, 5a correspond to first switching states S1a of the first switching unit 3a in which the first switching unit 3a draws current idc1 from the intermediate circuit 4. The current values idc1=0 correspond to second switching states S2a of the first switching unit 3a in which the first switching unit 3a does not draw any current idc1 from the intermediate circuit 4. FIGS. 3b, 4b and 5b each show the current profile of the current idc2 against the time t between the second switching unit 3b and the second winding system 2b during the second switching sequence Q2. The current values idc2=1 according to FIGS. 3b, 4b, 5b correspond to first switching states S1b of the second switching unit 3b in which the second switching unit 3b draws current idc2 from the intermediate circuit 4. The current values idc2=0 correspond to second switching states S2b of the second switching unit 3b in which the second switching unit 3b does not draw current idc2 from the intermediate circuit 4. FIGS. 3c, 4c and 5c each show the current profile of the total intermediate circuit current idc against the time t which results from adding the currents idc1, idc2. In addition, FIGS. 3c, 4c and 5c show a profile v of the distortions of the intermediate circuit current idc and of the intermediate circuit voltage udc.

FIGS. 3a and 3b show that the first switching states S1a of the first switching unit 3a and the first switching states S1b of the second switching unit 3b occur during phases I and III of the operating cycle and therefore overlap. The current values idc1=1 and idc2=1 are therefore added during phases I and III, with the result that the total current idc during phases I and III is occasionally idc=2. The total current idc according to FIG. 3c therefore fluctuates between 0 and 2, which results in a high value V1 of a distortion factor. In the case of such a choice of the switching sequences Q1, Q2 of the first and second switching units 3a, 3b, the smoothing capacitor 6 must have corresponding dimensions and is therefore very cost-intensive.

FIGS. 4a and 4b show that the first switching states S1a of the first switching unit 3a occur during phases II and IV and the first switching states S1b of the second switching unit 3b occur during phases I and III. The first switching states S1a of the first switching unit 3a and the first switching states S1b of the second switching unit 3b therefore do not overlap. Therefore, current idc1, idc2 is only ever drawn from the intermediate circuit 4 by one of the two switching units 3a, 3b for each phase I, II, III, IV. The currents idc1=0 and idc2=1 are therefore added during phases I and III and the currents idc=1 and idc2=0 are added during phases II and IV to form the total current idc according to FIG. 4c. The total current idc therefore fluctuates between 0 and 1, which results in a second distortion factor value V2 which is lower than the first distortion factor value V1. In the case of such a choice of the switching sequences Q1, Q2 of the first and second switching units 3a, 3b, the smoothing capacitor 6 can have smaller dimensions. Costs can therefore be saved.

FIGS. 5a and 5b show that the first switching states S1a of the first switching unit 3a occur during phases II and IV and the first switching states S1b of the second switching unit 3b occur during phases I and III. The first switching states S1a of the first switching unit 3a and the first switching states S1b of the second switching unit 3b therefore do not overlap. It is also shown that the second switching sequence Q2 has third switching states S3b in which a current idc2=−1 flows. A current idc2 is therefore fed back into the intermediate circuit 4 via the second switching unit 3b during the third switching state S3b. The third switching states S3b occur in this case in phases II and IV in which the first switching unit 3a has the first switching state S1a and therefore draws current idc1 from the intermediate circuit 4. The third switching states S3b are in the center of the respective phases II and IV here. In addition, a period Z2 of the first switching state S1b of the second switching unit 3b according to FIG. 5b is greater than a period Z1 of the first switching state S1b of the second switching unit 3b according to FIG. 4b. Therefore, during the first switching state S1b according to FIG. 5b, more current idc2 than is actually required for the second winding system 2b is drawn from the intermediate circuit 4 by the second switching unit 3b. The actually required current idc2 is drawn from the intermediate circuit 4 during the period Z1 and is supplied to the second winding system 2b via the second switching unit 3b. The surplus current Z2−Z1, that is to say the current idc2 not required by the second winding system 2b, is supplied to the intermediate circuit 4 again during the third switching state S3b of the second switching unit 3b.

The switching sequences Q1, Q2 according to FIGS. 5a, 5b result in a total current idc according to FIG. 5c which, although likewise fluctuating between 0 and 1, has a more uniform profile than the total current idc according to FIG. 4c. This results in a third distortion factor value V3 which is lower than the second distortion factor value V2. In the case of such a choice of the switching sequences Q1, Q2, the dimensions of the smoothing capacitor 6 can be reduced further. It is therefore possible to use a particularly cost-effective smoothing capacitor 6.

LIST OF REFERENCE SIGNS

1 Drive unit
2 Rotating field machine
2a, 2b Winding systems
3 Transmission device
3a, 3b Switching units
4 Intermediate circuit
5 Control device
6 Smoothing capacitor
7 n-phase rotating field machine
7a, 7b Phase systems
8 n-phase inverter
8a, 8b Inverters
9 Strands
10 Switches
11 m-phase rotating field machine
11a Phase system
11b Excitation winding system
12 Inverter
13 Excitation device
14 Switch
idc, idc1, idc2 Intermediate circuit currents
U, U', U'', V, V', V'',
W, W', W'' Phases
S1a, S1b First switching states
S2a, S2b Second switching states
S3b Third switching states
Q1, Q2 Switching sequences
I, II, III; IV Switching sequence phases
Z1, Z2 Periods
t Time
v Course of the distortion
V1, V2, V3 Distortion factors of the voltage

What is claimed is:

1. A method for operating a rotating field machine of a motor vehicle, the method comprising:
   supplying at least two winding systems of the rotating field machine with current from an intermediate circuit by way of a transmission device having at least two switching units, wherein:
      the current is supplied to the winding systems according to a first switching sequence for a first switching unit for supplying a first winding system and a second switching sequence for a second switching unit for supplying a second winding system,
      the first switching sequence and the second switching sequence are determined for each operating cycle of the rotating field machine,
      first switching states, in which the respective switching unit draws current from the intermediate circuit, and second switching states, in which the respective switching unit does not draw current from the intermediate circuit, are determined for each of the switching sequences, and
      the first switching states in the first switching sequence are determined so as to not occur at a same time as the first switching states in the second switching sequence; and
   feeding, by an assigned switching unit of the switching units, a current provided by an assigned winding system of the winding systems into the intermediate circuit, according to third switching states of the second switching sequence, wherein the third switching states are determined so as to occur at a same time as at least a portion of the first switching states of the first switching sequence,
   wherein a current requirement is determined for an at least temporarily feeding winding system for each operating cycle, and a duration of the first switching states in the switching sequence of the assigned switching unit is determined such that a total current fed into the winding system is a sum of the current requirement and a predetermined surplus current, and a duration of the third switching state is determined such that excess current is fed back into the intermediate circuit.

2. The method according to claim 1, wherein
an n-phase rotating field machine having the first winding system in the form of a first phase system with i phases and the second winding system in the form of a second phase system with j phases, where i+j<=n, is operated as the rotating field machine by way of the transmission device having an n-phase inverter, wherein
the switching sequences are determined in such a manner that the first phase system supplied via the first switching unit of the n-phase inverter and the second phase system supplied via the second switching unit of the n-phase inverter generate a predetermined space vector.

3. The method according to claim 1, wherein
a separately excited rotating field machine having the first winding system in the form of a phase system of a stator of the separately excited rotating field machine and the second winding system in the form of an excitation winding system of a rotor of the separately excited rotating field machine is operated as the rotating field machine by the transmission device having the first switching unit in the form of an inverter and the second switching unit in the form of an excitation device, wherein
the phase system of the stator is supplied with current from the intermediate circuit via the inverter and the excitation winding system is supplied with current from the intermediate circuit via the excitation device.

4. The method according to claim 3, wherein
the third switching states are determined for the second switching sequence of the excitation device, with the result that the excitation winding system of the rotor feeds current into the intermediate circuit via the excitation device for the first switching states in the first switching sequence in which the inverter draws current from the intermediate circuit in order to supply the phase system of the stator.

5. The method according to claim 1, wherein
a duration of the first switching state of one of the switching units is determined so as to be centered with respect to a duration of the second switching state of another one of the switching units.

6. The method according to claim 5, wherein
a duration of the third switching state in the first switching sequence is determined so as to be centered with respect to a duration of the first switching state in the second switching sequence.

7. The method according to claim 1, wherein
a duration of the third switching state in the first switching sequence is determined so as to be centered with respect to a duration of the first switching state in the second switching sequence.

8. A transmission device for a drive unit of a motor vehicle, comprising:
at least two switching units for supplying at least two winding systems of a rotating field machine of the drive unit with a current from an intermediate circuit;
a smoothing capacitor; and
a control device for controlling the switching units, wherein the control device is configured to execute a process to:
control a supply of current to the winding systems by:
determining a first switching sequence for a first switching unit for supplying current to a first winding system and a second switching sequence for supplying current to a second winding system for each operating cycle of the rotating field machine; and
determining first switching states, in which the respective switching unit draws current from the intermediate circuit, and second switching states, in which the respective switching unit does not draw current from the intermediate circuit, for each of the switching sequences, wherein the first switching states in the first switching sequence are determined so as to not occur at a same time as the first switching states in the second switching sequence; and
control a feed, by a switching unit of the switching units, of a current provided by an assigned winding system of the winding systems, into the intermediate circuit by determining third switching states of the second switching sequence, wherein the third switching states are determined so as to occur at a same time as at least a portion of the first switching states of the first switching sequence,
wherein a current requirement is determined for an at least temporarily feeding winding system for each operating cycle, and a duration of the first switching states in the switching sequence of the assigned switching unit is determined such that a total current fed into the winding system is a sum of the current requirement and a predetermined surplus current, and a duration of the third switching state is determined such that excess current is fed back into the intermediate circuit.

9. A drive unit for a motor vehicle, comprising:
a rotating field machine; and
a transmission device according to claim 8.

10. A motor vehicle comprising a drive unit according to claim 9.

* * * * *